FLIP FLOP

United States Patent Office 3,432,850
Patented Mar. 11, 1969

3,432,850
MOLECULAR PULSE TIME-DIVISION
MULTIPLEXER
Richard S. Chamberlin, Ellicott City, Md., assignor, by mesne assignments, to the United States of America as represented by the Secretary of the Navy
Filed Jan. 12, 1968, Ser. No. 697,454
U.S. Cl. 343—5                               14 Claims
Int. Cl. G01s 9/00; H04j 3/00

ABSTRACT OF THE DISCLOSURE

A radar display control system for displaying tactical signals during predetermined portions of a segment of a multiplex cycle. A plurality of binary counters, each stage of which has an output with a time duration of twice that of the previous stage, is used to enable various tactical signal channels so that signals on these channels are passed on to a utilization device. The outputs of the binary counters are also used to activate an intensity gate generator which likewise is connected to the utilization device. Thus, the outputs of the enabling circuit and the intensity gate generator control the operation of the utilization device so that only a predetermined portion of the tactical signals are passed to the utilization device.

BACKGROUND OF THE INVENTION

Field of the invention

The present invention relates to a radar control system and, more particularly, to a radar receiver control system for displaying tactical signals on a readout device during a portion of a segment of a multiplex cycle.

Description of the prior art

Many schemes have been used to achieve time-division multiplexing of pulses. Vacuum tubes, relays, diode matrices and other types of diode-transistor switching logic circuits can be used. However, each of these techniques possesses its own particular shortcomings in performance. Relay and vacuum tube versions, for example, suffer from standpoints of power, volume, noise and speed. Also, diode multiplexing has disadvantages of limited logic flexibility, poor reliability and increased volume when compared with emitter-coupled logic. Saturated diode-transistor logic suffers from limited fan-out capability, low noise, immunity at high temperatures, size and it inherently generates higher noise transients on the ground and power supply.

In addition to the above-listed disadvantages present in prior art devices, it is noted that these former systems required a number of printed circuit cards, at least six saturable reactors and significantly high power requirements. Furthermore, these early radar display control systems had over sixty adjustment potentiometers which had to be manipulated in order to accomplish a clear and desirable display control.

SUMMARY OF THE INVENTION

According to the present invention, a binary counter having a predetermined number of emitter-coupled flip-flop circuits is activated by a clock oscillator so that each flip-flop has two outputs which generate signals of opposite plurality simultaneously. The time duration of the output of each successive flip-flop stage of the counter is twice that of the immediately preceding stage. Selected outputs of the counter are coupled to an enabling circuit composed of N emitter-coupled logic AND circuits, the output of each AND circuit being coupled to one channel of a linear signal multiplexer to which N tactical signals are passed. The outputs of the signal multiplexers are then amplified and passed to the control elements of the readout device.

The outputs of the binary counter are also coupled to an intensity gate generator circuit having N channels composed of a number of monostable multivibrators and AND circuits. The outputs of the intensity gate generator circuit are essentially a train of pulses which may have a non-symmetrical cycle but do have a predetermined repetition rate. The outputs of the enabling circuit and the intensity gate generator are coupled to corresponding channels of an N stage time-division multiplexer comprised essentially of N emitter-coupled logic AND circuits, the outputs of which are coupled to an OR circuit. The output of the OR circuit is then amplified and coupled to a control element of the readout device.

Thus, one of the individual N tactical signals is passed to the readout device during the specific portion of the signal multiplexer cycle during which the gate of the signal multiplexer to which that signal is supplied is activated by the corresponding AND circuit of the enabling circuit. The time-division multiplexer controls an element of the readout device to permit only a specific portion of the tactical signal passed to the readout device to be used by that readout device.

From the above description it is obvious that the present invention operates to eliminate a vast majority of the inherent weaknesses apparent in the earlier devices. Thus, the present invention presents a radar display control system which uses emitter-coupled current mode logic to perform the functions of intensity of linear signal multiplexing, as well as a successful display control system using molecular logic blocks. The system presents a display control using no adjustments, as contrasted with the use of over sixty adjustable potentiometers in other devices, this performance being made possible in part by the use of fast switching (ten nanoseconds) current mode logic. Also, the present radar control device has fewer and more reliable elements to accomplish its function, the entire intensity multiplexer and enable gate generators, for example, are packaged on a single printed circuit card.

The use of emitter-coupled logic blocks afford significant hardware savings over other molecular approaches in that either polarity output is available in each logic block. From a noise standpoint, this type of logic is far superior since a constant current drain from the power supply is maintained. In contrast, saturated logic molecular blocks generate noise on the supply in a subsystem which supplies outputs on the storage tube and can be viewed by the operator. Hence, noise reduction was extremely critical and significant as a parameter of performance. The approach used in the present radar control device combines the advantages of high reliability and high packaging density with low cost, heretofore not achieved in the art of display controls.

It is an object of the present invention to provide a control for the utilization circuit of a tactical radar system.

Another object of the present invention is the provision of a time-division multiplexer system for applying a tactical signal to the utilization device for only a portion of the multiplexer cycle.

Another object of the present invention is to provide a radar display control system in which current mode logic is used to perform intensity in linear signal multiplexing.

Another object of the present invention is to provide a radar display control system which utilizes molecular logic blocks.

Still another object of the present invention is the provision of a display control system which utilizes no adjustment potentiometers.

Yet another object of the present invention is the

3 provision of the radar display control system in which the entire intensity multiplexer and enable gate generator are packaged on a single printed circuit card.

A final object of the present invention is the provision of a display control system which combines the advantages of high reliability, high packaging density and low cost.

Other objects, advantages and novel features of the present invention will become apparent from the following detailed description of the invention when considered in conjunction with the accompanying drawings.

BRIEF DESCRIPTION OF THE DRAWINGS

FIGS. 6a through 6j show illustrative time diagrams of the operation of one channel of the system shown in FIG. 1.

DESCRIPTION OF THE PREFERRED EMBODIMENTS

Figure 1:
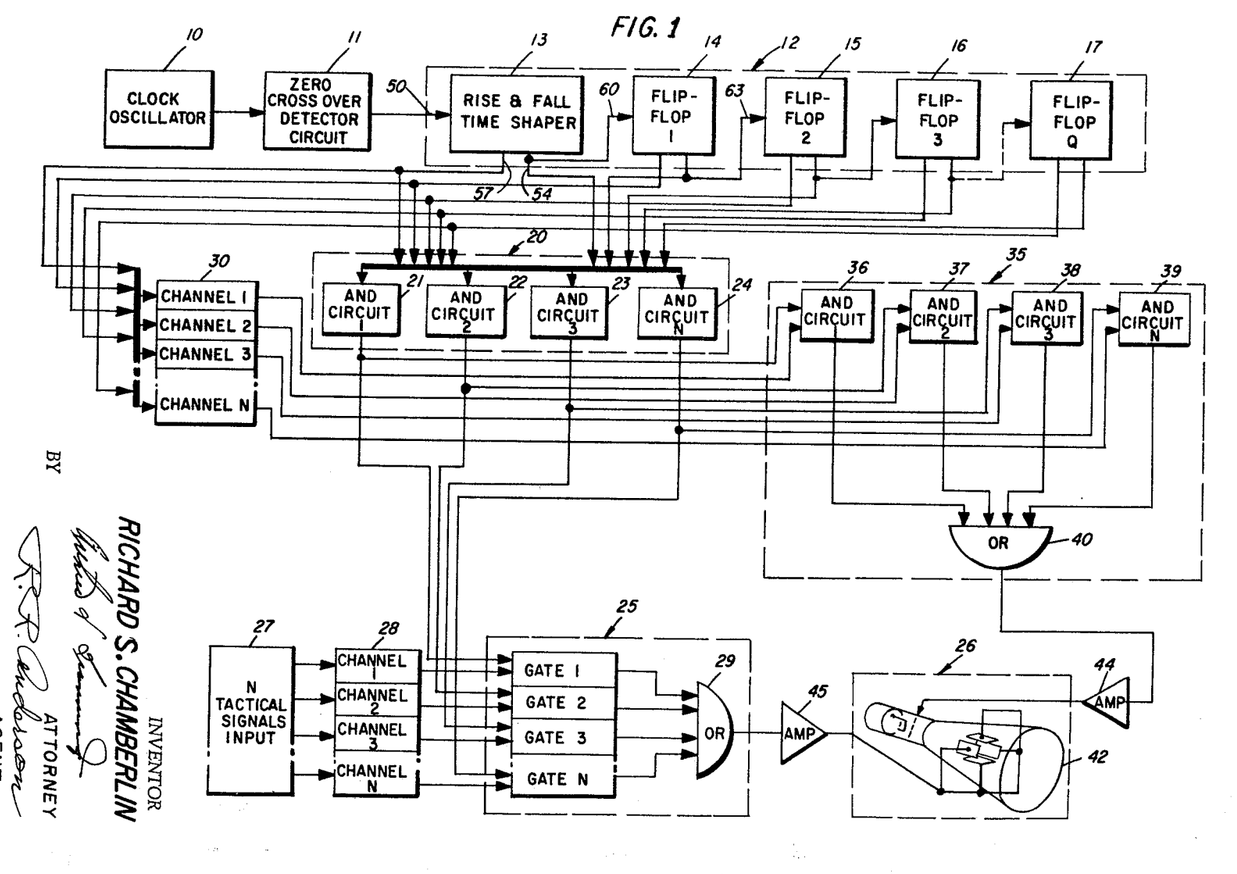
FIG. 1 shows a block diagram of the invention.

Referring now to FIG. 1, there is shown a clock oscillator 10 coupled to a zero crossover detector circuit 11. The clock oscillator may be any single line sinusoidal signal generator which generates a signal possessing extremely stable frequency and amplitude in characteristics. The zero crossover detector circuit is a minimum hystersis Schmitt trigger circuit. The output of detector circuit 11 is passed to the input of a binary counter 12, each stage of which has a time duration twice that of the preceding stage. The first stage of binary counter 12 is a rise and fall time shaper 13 which is essentially a half-adder and is described in greater detail in FIG. 2. The counter has Q flip-flops which are described in greater detail in FIG. 3 and correspondingly the counter has Q+1 pairs of complementary outputs. For illustrative purposes, flip-flops 14, 15, 16 and 17 are disclosed. As will be apparent from the discussion below, the number of stages of counter 12 is arbitrary and can be varied to suit system requirements. The outputs of binary counter 12 are selectively coupled to the various inputs of N emitter coupled logic AND circuits 21, 22, 23 and 24 comprising enabling circuit 20. AND circuits 21 through 24 are described in greater detail in FIG. 4. The N outputs of enabling circuit 20 are coupled to the corresponding channels of a linear signal multiplexer 25.

N tactical signals are fed from a signal input unit 27 to a linear signal converter 28 and the outputs of linear signal converter 28 are fed to corresponding channels of signal multiplexer 25.

Signal input 27 may be any standard receiver capable of receiving tactical information while linear signal converter 28 is composed of standard attenuators and amplifiers which adjust the amplitude of the incoming signals to render them compatible with the other units of the entire system.

Multiplexer 25 passes a tactical signal through the corresponding channel for a period of time determined by which outputs of binary counter 12 are connected to the corresponding AND circuit of enabling circuit 20. The outputs of signal multiplexer 25 are amplified by amplifier 45 and coupled to one of the readout elements of a utilization device 26, which may comprise a direct view storage tube 42 as shown in FIG. 1.

4

Figure 4:
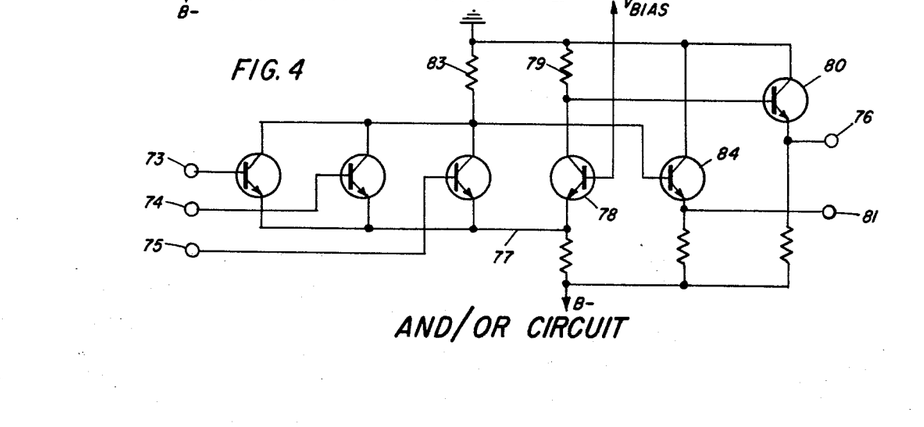
FIG. 4 shows a circuit diagram of the AND/OR circuit used in the enabling circuit and in the intensity time division multiplexer of FIG. 1.

The outputs of binary counter 12 are also selectively coupled to N pulse train generators contained within an intensity gate generator 30. Intensity gate generator 30 is composed of N channels of monostable multivibrators and logical AND/OR gates which are arranged in a predetermined manner so as to activate the utilization device to utilize the applied tactical signals for a portion of the time during which that signal is applied to the readout elements of the utilization device. A sample channel of the intensity gate generator 30 is described in FIG. 5. The N outputs of intensity gate generator 30 are coupled to the corresponding N AND circuits of an intensity time-division multiplexer 35. Time-division multiplexer 35 contains N emitter coupled logic AND gates 36, 37, 38 and 39 shown by way of illustration, and an OR circuit 40. A detailed drawing of AND circuits 36 through 39 is shown in FIG. 4. Each of the second inputs to AND circuits 36 through 39 is coupled to the corresponding output of AND circuits 21 through 24.

The outputs of the AND circuits 36, 37, 38 and 39 are coupled as the inputs of OR circuit 40. The output of OR circuit 40 is amplified by an amplifier 44 and coupled to a control element of a utilization device 26. The utilization device may be any standard device capable of displaying or reading out tactical information. By way of illustration it is shown as a direct view storage tube 42 with the output of linear signal multiplexer 25 coupled to the beam deflection plates and the output of time-division multiplexer 35 coupled to the intensification grid. However, the utilization device is not limited to a direct view storage tube but can be any other equivalent device such as a general purpose computer.

Figure 2:
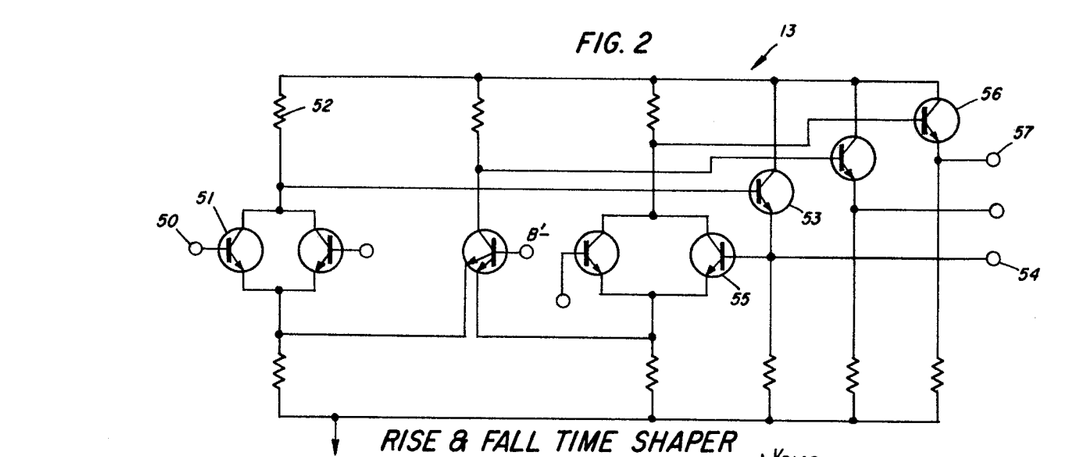
FIG. 2 shows a circuit diagram for the rise and fall time shaper used in the embodiment of FIG. 1.

FIG. 2 illustrates in detail the rise and fall time shaper 13. The time shaper is essentially a standard transistorized half-adder with the outputs coupled to the emitters of the output transistors. The shaper has an extremely wideband frequency-amplitude response characteristic and, therefore, is capable of supplying substantially square pulses to subsequent logic circuitry. The signal applied at input terminal 50 is inverted through transistor 51 and coupled through transistor 53 to provide the negative-going square waves of the upper waveform shown in FIG. 6b at terminal 54. The same potential as given at terminal 54 is also coupled by direct connection to the base of transistor 55 and subsequently coupled through transistor 56 to generate a positive-going square waveform at terminal 57 as shown in the lower portion of FIG. 6b, to be of opposite polarity to that generated at terminal 54. Thus, the rise and fall time shaper is capable of generating two complementary square wave outputs upon activation of the input terminal.

Figure 3:
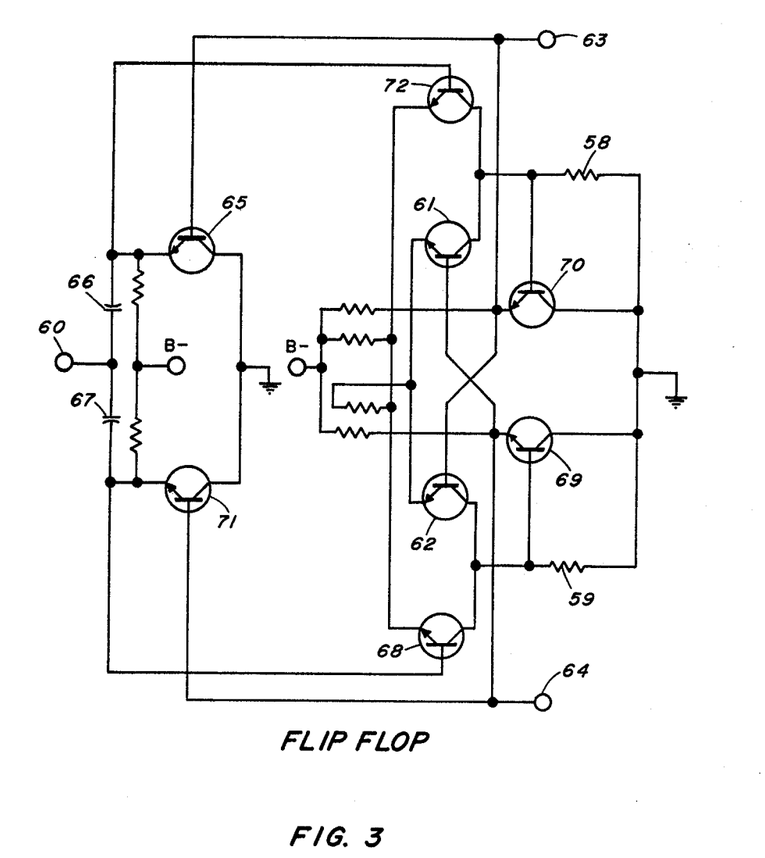
FIG. 3 shows a circuit diagram of the flip-flop circuits used in the counter of FIG. 1.
Figure 6:
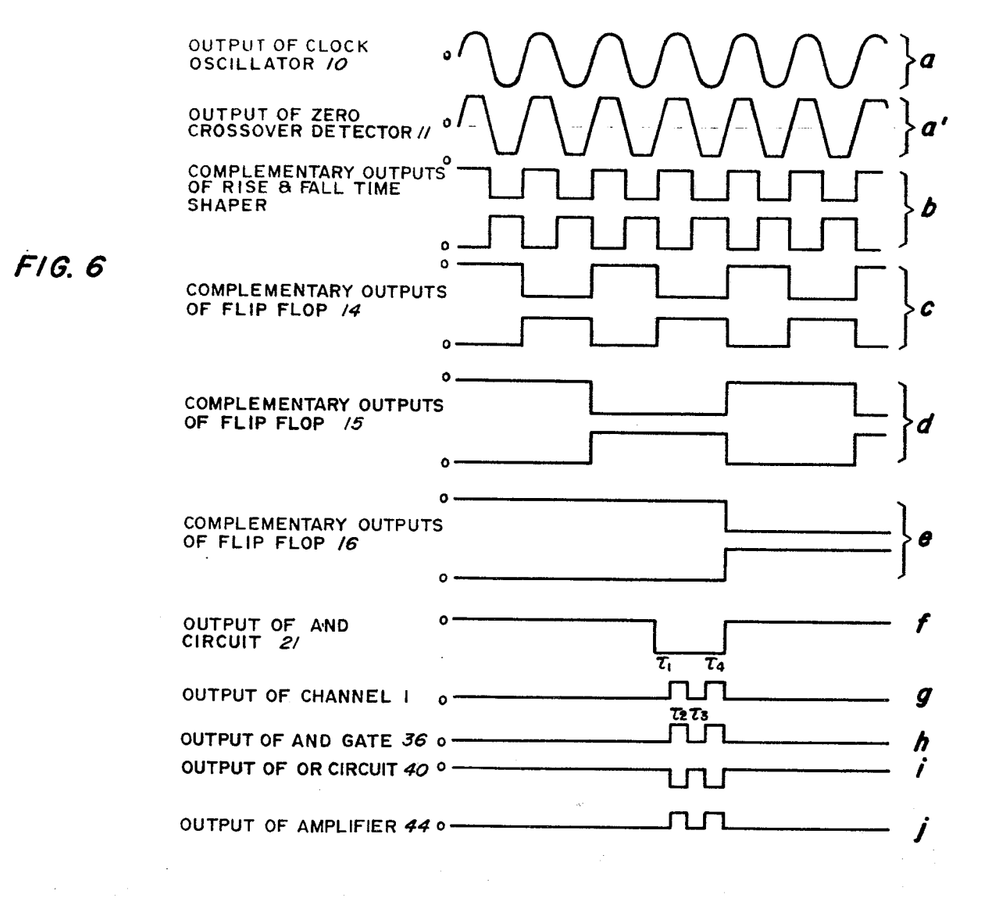

FIG. 3 is a detailed description of flip-flops 14, 15, 16 and 17. FIGS. 6c, 6d, and 6e are illustrative timing diagrams of the output waveforms of flip-flops 14, 15 and 16, respectively. One of the complementary outputs of the rise and fall time shaper 13 is coupled to input terminal 60 of the flip-flop. If it is assumed that initially transistor 62 is more conductive and transistor 61 is less conductive, the current through resistor 59 biases transistor 69 to reduce the conductivity of transistor 69 to render the emitter voltage, which is tied to terminal 64, more negative. Correspondingly, the lower conductivity of transistor 61 causes less conductivity through resistor 58 to thereby bias transistor 70 to be more conductive to render the emitter voltage, which is tied to terminal 63, more positive. Under such conditions, the voltage at the emitter of transistor 71 is more negative than the voltage at the emitter of transistor 65 and correspondingly the voltage at the base of transistor 68 is more negative than the voltage at the base of transistor 72. Thus, when a negative-going pulse is applied to terminal 60, it is coupled through steering capacitors 66 and 67 and applied to the base terminals of transistors 68 and 72, respectively. Since the voltage at the base terminal of transistor 68 is more negative than the voltage at the base terminal of transistor 72, the negative-going pulse does not switch the state of conductivity of transistor 68 due to insufficient amplitude of voltage at the base of transistor 68. On the other hand, transistor 72 is rendered conductive to render more negative the voltage applied at the base of transistor 70 the emitter of which is tied to terminal 63. The emitter of transistor 70 follows the base of the transistor and thereby reduces the voltage applied to the base of transistor 62 to thereby reduce the conductivity of transistor 62. Thus, the collector voltage of transistor 62 tends to become more positive and the base voltage of transistor 69 tends to become more positive. Transistor 69 is in essence an emitter-follower. The voltage at the emitter of transistor 69 which is tied to terminal 64, tends to become more positive thereby coupling a regenerative positive-going voltage to the base of transistor 61 tending to increase the conductivity of transistor 61 during the presence of and after the disappearance of the transient negative-going pulse coupled to the base of transistor 72 until the next negative-going pulse is applied to terminal 60.

According to the above analysis, the output of terminal 64 assumes the lower waveform shown in FIG. 6c and the output of terminal 63 assumes the upper waveform shown in FIG. 6c. Thus, the first negative-going edge of the input pulse changes the state of the outputs. This change of state occurs at every succeeding negative-going edge of the input pulse.

FIG. 4 is a detailed description of the emitter coupled logic circuitry used in AND circuits 21 through 24 and 36 through 39. As is well known, any AND circuit may be converted to an OR circuit and vice-versa by changing the arbitrary designation of the inputs and outputs. In the operation of FIG. 4 as an AND circuit, the binary one inputs applied to terminals 73, 74 and 75 correspond to the more negative voltage levels and the high voltage level at terminal 76 is binary one output. When a binary zero pulse, i.e., one of more positive potential is applied to either terminals 73, 74 or 75, the voltage on the common emitter line 77 rises. Under such circumstances, the voltage between the base and emitter terminals of transistor 78 is of insufficient potential to render it conductive. The collector voltage rises when transistor 78 becomes non-conductive thereby reducing the voltage drop across resistor 79. The voltage rise at the collector of transistor 78 is coupled by emitter-follower action through transistor 80 to terminal 76. At the same time that transistor 80 is becoming more conductive, the current through resistor 83 is increasing due to a high potential applied to any of the inputs thereby rendering the potential applied to the base of transistor 84 more negative. The voltage at terminal 81 decreases to thereby generate an output which is the complement of that of terminal 76.

Thus, the circuit is operative as an AND gate in that if the inputs at terminals 73, 74 and 75 are all in the more negative voltage state, a less negative voltage will appear at terminal 76 and a more negative voltage appears at terminal 81. If terminal 76 is used as the output, the less negative state is chosen as the binary one and if terminal 81 is used as the output, the more negative state is chosen as the binary one.

Figure 5:
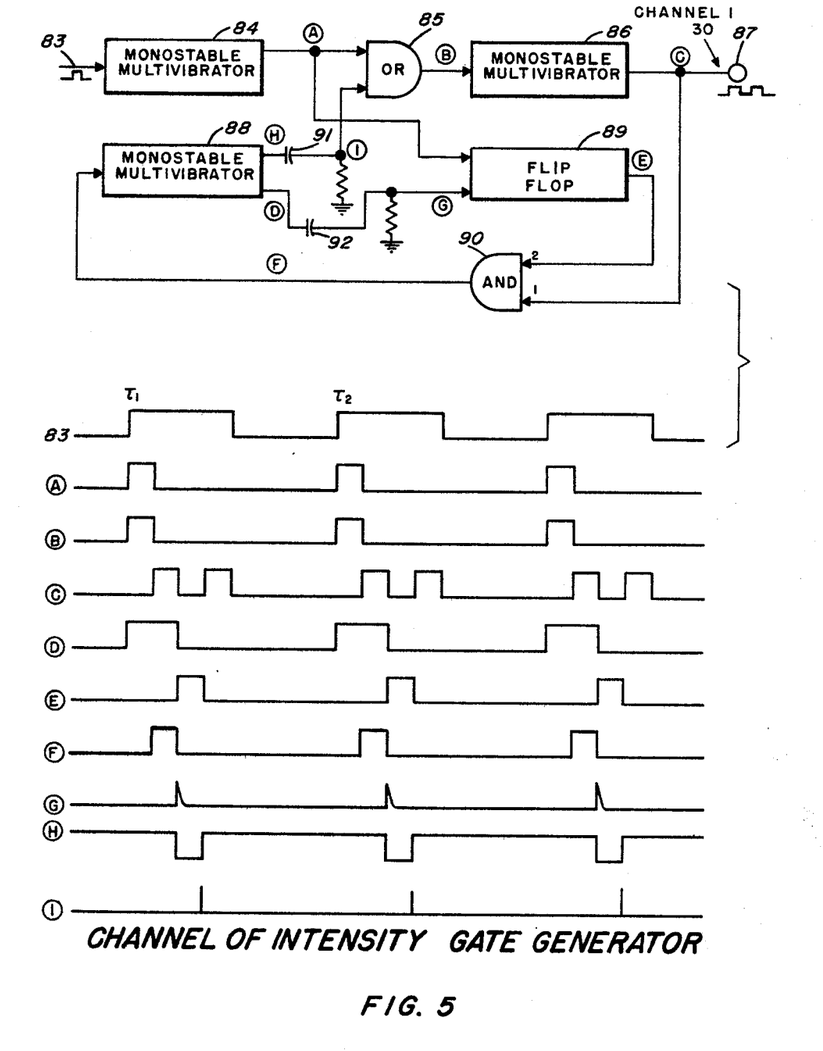
FIG. 5 shows an exemplary block diagram of a channel of a single intensity gate generator circuit and its associated waveforms which may be used in the embodiment of FIG. 1.

FIG. 5 discloses a sample channel, along with its associated waveforms, such as channel 1, for example, as contained within the intensity gate generator 30. One of the outputs of binary counter 12, such as that from flip-flop 14, is selected to be the input of the channel at terminal 83. For illustrative purposes, the lower waveform of FIG. 6c, which is a positive-going waveform as generated by one of the two complementary outputs of flip-flop 14, is taken to be the input waveform to terminal 83. FIG. 6g is the output waveform of channel 1, as will be described hereinafter.

Turning now to the structure of the circuit making up channel 1, there will be seen that a positive-going waveform as produced by flip-flop 14, is applied at terminal 83, this terminal being connected to a monostable multivibrator 84, the output of which goes to an OR circuit 85. The output of OR circuit 85 is passed to a second monostable multivibrator 86, the output of which is applied to an output terminal 87. Forming a feedback circuit between output terminal 87 and OR circuit 85, there is an AND circuit 90 whose output is applied to a third monostable multivibrator 88, the output of 88 passing to a differentiating circuit 91, consisting of a condenser and resistor before being applied as a second input to OR circuit 85. A second output from monostable multivibrator 88 passes through a differentiating circuit 92 before being applied as one input to a resettable flip-flop circuit 89. The output of 89 is applied as a second input to AND circuit 90. In order to furnish the second input to resettable flip-flop circuit 89, there is a connection to the output of monostable multivibrator 84.

In describing the operation of the circuit given in FIG. 5, reference is made to the waveforms 5a through 5i, these waveforms being present in the circuit at points corresponding with the waveform number. At some time T1 the positive-going edge of the waveform presented at terminal 83 triggers multivibrator 84 to produce an output waveform 5a, this waveform in turn sets flip-flop 89 to a "1" state. At the same time, OR gate 85 passes waveform 5a which acts as a trigger pulse (waveform 5b) for multivibrator 86. The output of multivibrator 86 (waveform 5c) provides the first pulse shown in waveform 5c. This pulse passes through AND gate 90 via input number 1 since there is an enabling voltage, waveform 5e, present at input number 2. Waveform 5f, which is the output of AND circuit 90, triggers multivibrator 88 to yield two outputs as shown by waveforms 5d and 5h. Output 5d is differentiated by the resistance-capacitance circuit 92 to provide waveform 5g, which is used for resetting flip-flop 89 to a "0" state. Waveform 5h is differentiated by resistance-capacitance circuit 91 to yield waveform 5i, which, when applied as a second input to OR circuit 85, triggers multivibrator 86 thereby generating the second pulse of waveform 5c. Return feedback action by waveform 5f would be inhibited this time since waveform 5e is at the "0" level. The above cycle will repeat at time T2, which, of course, is the next positive-going input pulse applied to terminal 83. From the above description, it is clear that the output of channel 1, which is being used as an exemplary illustration, consists of two positive-going pulses for each time that the channel is triggered. The other channels will also have positive-going output pulses, but spaced at different time intervals.

It will be shown in the subsequent discussion of the operation of the entire system that the shape and frequency of the pulse train generated by one of the individual networks of the intensity gate generator 30 determines the portion of time during the corresponding segment of the multiplex period during which the corresponding tactical signal is utilized or displayed by the utilization device.

In the normal operation of the system, N tactical signals are received at the tactical signal input 27 on N channels. Each signal is passed to its respective channel in linear signal converter 28 where it is either amplified or attenuated to render the amplitude of the signal compatible with the rest of the system. Each signal is then passed to its respective channel in linear signal multiplexer 25. The system is operative to utilize these N signals in the following manner:

A sinusoidal signal is generated by clock oscillator 10 having an extremely stable frequency and amplitude characteristic as shown in FIG. 6a. The signal is passed to zero crossover detector circuit 11 which gives an output shown in FIG. 6a, thereby causing rise and fall time shaper 13 to generate a positive-going output pulse on one of the output terminals whenever the sinusoidal signal of the oscillator changes sign. The time shaper 13 further generates a negative-going output pulse on the complementary output whenever the signal generated by oscillator 10 changes sign. The waveforms of time shaper 13 are shown in FIG. 6b. The input terminal of time shaper 13 corresponds to terminal 50 shown in FIG. 2 and the output terminal having a waveform as shown in the upper waveform of FIG. 6b is generated from output terminal 54 while the waveform having a pattern similar to that shown in the lower waveform of FIG. 6b is generated from output terminal 57. The output from terminal 54 is fed to terminal 60 of flip-flop 14. The outputs of flip-flop 14 generate a wave pattern as shown in FIG. 6c. Flip-flop 14 is initially set to generate the upper waveform shown in FIG. 6c at terminal 63, which is coupled to flip-flop 15. Flip-flop 15 therefore generates a waveform as shown in FIG. 6d and is coupled to flip-flop 16 which generates a waveform as shown in FIG. 6e. Selected outputs of the flip-flops are coupled to AND gates 21, 22, 23 and 24 shown in detail in FIG. 4 to generate a sequence of outputs during the multiplex cycle.

According to the operation of the AND circuit shown in FIG. 4, the lower voltage level to the AND circuit inputs is the binary one level and the higher voltage level is the binary zero level. For illustrative purposes, it is assumed that the upper waveform of FIG. 6c corresponding to one of the outputs of flip-flop 14 and the upper waveform of FIG. 6d corresponding to one of the outputs of flip-flop 15 are applied to terminals 73 and 74, respectively, of AND circuit 21 as detailed in FIG. 4. If the low voltage level at terminal 76 is arbitrarily designated the binary one level, the output at terminals 76 will have a waveform as shown in FIG. 6f. Under such conditions terminal 75 which is not used by AND circuit 21 is kept at a constant low voltage level. Thus, the output level at terminal 76 reaches the binary one state only between time $t_1$ and $t_4$ which is the period of time during which one of the outputs from flip-flop 14 and one of the outputs from flip-flop 15 are in the binary one or low voltage state. During this period of time, the gate 1 of signal multiplexer 25 is activated by the output of AND circuit 21 so that tactical signal 1 is passed through OR circuit 29 and amplifier 45 to the plates of direct view storage tube 42.

Between $t_1$ and $t_4$ the input to AND circuit 36 from AND circuit 21 is activated. It is assumed that channel 1 of the intensity gate generator has the circuit configuration shown in FIG. 5. With the input terminal 83 being coupled to one of the two complementary outputs of flip-flop 14 and having the lower waveform shown in FIG. 6c, channel 1 generates two positive-going pulses beginning at the beginning of every positive-going pulse generated by flip-flop 14, as shown in FIG. 6g.

The output of channel 1 of intensity gate generator 30 is coupled to AND circuit 36, shown in detail in FIG. 4, of time-division multiplexer 35. The input to AND circuit 36 is therefore in the binary one state when in the low voltage level and the output of AND circuit 36 is taken from terminal 76 and is therefore in the high voltage level when in the positive state. The output of AND circuit 36 is the waveform shown in FIG. 6h.

The output of channel 1 of intensity gate generator 30 is coupled to AND circuit 36, shown in detail in FIG. 4, of time-division multiplexer 35. The input to AND circuit 36 is therefore in the binary one state when in the low voltage level and the output of AND circuit 36 is taken from terminal 76 and is therefore in the high voltage level when in the positive state. The output of AND circuit 36 is the waveform shown in FIG. 6h.

The output of AND circuit 36 is passed to OR gate 40, inverted (FIG. 6i) and amplified by amplifier 44. In amplifier 44 the signal is again inverted (FIG. 6j) and passed to the grid of direct view storage tube 42 as positive-going pulses to thereby enable tactical signal 1 to pass through channel 1 to the plates of the tube between $t_1$ and $t_4$ to be viewed on the screen between $t_2$ and $t_3$.

Figure 7:
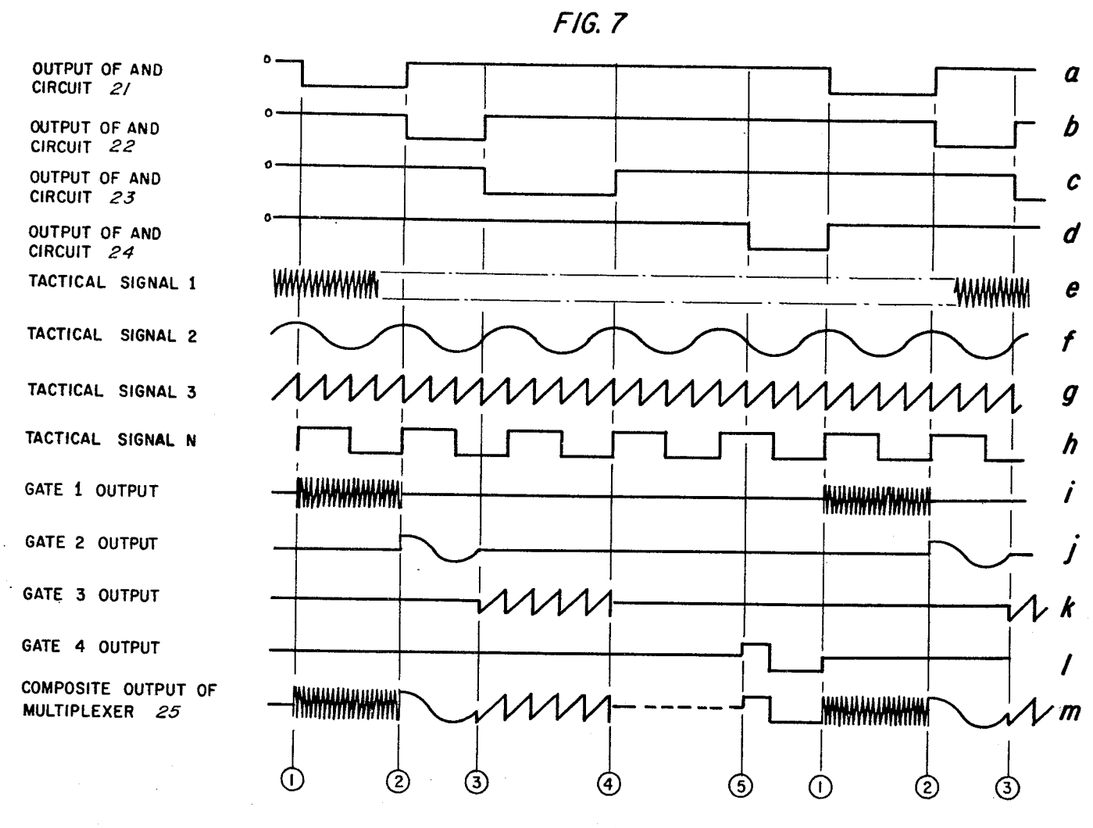
FIGS. 7a through 7w show illustrative time diagrams of the operation of four channels of the system shown in FIG. 1.

In the above description, the entire system was described in conjunction with the utilization of one tactical signal for illustrative purposes. FIGS. 7a through 7w disclose timing diagrams of the operation of four channels of the system and the manner in which the tactical signal associated with each channel is utilized. The outputs of binary counter 12 are coupled to the inputs of enabling gate generator 20 to cause AND circuits 21 through 24 to generate the waveforms shown in FIGS. 7a through 7d, respectively, FIGS. 7e through 7h disclose the waveforms of four exemplary tactical signals passed to the respective channels of linear signal multiplexer 25.

The low voltage levels of the outputs of AND circuits 21 through 24 are taken to be the binary one state and since AND circuits 21 through 24 activate the associated channels of linear signal multiplexer 25, the outputs of the respective channels of the multiplexer have the waveforms shown in FIGS. 7i through 7l, respectively. The waveform of the composite output of multiplexer 25 is passed through amplifier 45 to utilization device 26 is shown in FIG. 7m.

The output waveforms of four channels of intensity gate generator 30 are shown in FIGS. 7n through 7q with the binary state as indicated. These waveforms could be obtained in a manner well known in the art by coupling the appropriate outputs of binary counter 12 to the proper arrangements of multivibrators, monostable multivibrators or other special logic networks.

FIGS. 7r through 7u disclose waveforms of the outputs of AND circuits 36 through 39 of time-division multiplexer 35, with the binary state as indicated. The output of AND circuit 36 is controlled by the output of AND circuit 21 having a waveform shown in FIG. 7a and by the output of the first channel of intensity gate generator 30 having a waveform shown in FIG. 7n. The output of AND circuit 37 is controlled by the output of AND circuit 22 having a waveform as shown in FIG. 7b and by the output of the second channel of intensity gate generator 30 having a waveform as shown in FIG. 7o. The output of AND circuit 38 is controlled by the output of AND circuit 23 having a waveform as shown in FIG. 7c and by the third channel of intensity gate generator 30 having a waveform as shown in FIG. 7p. The output of AND circuit 39 is controlled by the output of AND circuit 24 having a waveform as shown in FIG. 7d and by the output of the N channel of intensity gate generator 30 having a waveform as shown in FIG. 7q.

FIG. 7v discloses the composite waveform passed through OR circuit 40 of time-division multiplexer 35. FIG. 7w shows a waveform of the tactical signals utilized by utilization device 26.

Thus, it is seen that the system is capable of causing the utilization device to utilize the signal passed to it during one segment of a multiplex cycle for only a portion of that cycle. The utilization of a signal during only a portion of the cycle has been found to reduce much of the clutter that has been consistently observed on the screen of the direct view storage tube. Furthermore, the transient effect observed when the sweep of the screen changes from a representation of one tactical signal to a representation of a subsequent tactical signal has introduced undesirable transients. The utilization of a tactical signal during only a portion of the segment of the multiplex cycle during which the signal is passed to the tube obviates these undesirable transients. As was previously stated, the utilization device can be any standard general purpose computer or any other known readout device.

Obviously many modifications and variations of the present invention are possible in the light of the above teachings. It is therefore to be understood that within the scope of the appended claims the invention may be practiced otherwise than as specifically described.

What is claimed is:

1. A control system for a radar echo signal utilization device comprising
reference pulse generating means containing a binary counter having a plurality of stages for generating a pulse at each stage having a time duration which is an integral multiple of the time duration of the pulse in the next preceeding stage;
a first enabling circuit coupled to said reference pulse generating means and having N stages for generating a first set of N enabling pulses;
a signal multiplexing circuit coupled to said first enabling circuit and having N stages coupled to the corresponding stages of said first enabling circuit and operative to multiplex N radar echo tactical signals;
a second enabling circuit coupled to said reference pulse generating means and having N stages for generating a second set of enabling pulses;
a time division multiplexing circuit coupled to said first and said second enabling circuits and having N stages each coupled to the corresponding stage of said first enabling circuit and said second enabling circuit to generate a set of N time division multiplex signals; and
a utilization device having an input element coupled to said signal multiplexing circuit and a control element coupled to said second enabling circuit to enable the utilization device to utilize the radar echo tactical signal during a portion of the time during which the signal is applied to the input element.

2. The system as described in claim 1 wherein the first stage of said binary counter contains a rise and fall time shaper consisting essentially of an emitter coupled logic half-adder.

3. The system as described in claim 2 wherein each stage of said binary counter except for the first stage comprises essentially an emitter coupled logic flip-flop.

4. The system as described in claim 3 wherein each stage of said first enabling circuit comprises essentially an emitter coupled logic AND circuit.

5. The system as described in claim 4 wherein each stage of said time division multiplexing circuit comprises essentially an emitter coupled logic AND circuit.

6. The system as described in claim 5 wherein said utilization device is a direct view storage tube and the input element comprises the plates of the tube and the control element comprises the grid of the tube.

7. The system as described in claim 6 wherein the first stage of said binary counter contains a rise and fall time shaper consisting essentially of an emitter coupled logic half-adder.

8. The system as described in claim 1 wherein each stage of said first enabling circuit comprises essentially an emitter coupled logic AND circuit.

9. The system as described in claim 8 wherein said utilization device is a direct view storage tube and the input element comprises the plates of the tube and the control element comprises the grid of the tube.

10. The system as described in claim 1 wherein each stage of said time division multiplexing circuit comprises an emitter coupled logic AND circuit.

11. The system as described in claim 10 wherein said utilization device is a direct view storage tube and the input element comprises the plates of the tube and the control element comprises the grid of the tube.

12. The system as described in claim 11 wherein each stage of said first enabling circuit comprises essentially an emitter coupled logic and circuit.

13. The system as described in claim 1 wherein said utilization device is a direct view storage tube and the input element comprises the plates of the tube and the control element comprises the grid of the tube.

14. The system as described in claim 13 wherein each stage of said binary counter except for the first stage comprises essentially an emitter coupled logic flip-flop.

References Cited

UNITED STATES PATENTS

| | | | |
|---|---|---|---|
| 2,644,933 | 7/1953 | Peterson et al. | 179—15 X |
| 3,194,889 | 7/1965 | McAdams | 179—15 |

RODNEY D. BENNETT, *Primary Examiner.*

CHARLES L. WHITHAM, *Assistant Examiner.*

U.S. Cl. X.R.

179—15